US007328677B2

(12) United States Patent
Hagiwara et al.

(10) Patent No.: US 7,328,677 B2
(45) Date of Patent: Feb. 12, 2008

(54) PLASMA-JET SPARK PLUG AND IGNITION SYSTEM

(75) Inventors: Katsunori Hagiwara, Mie (JP); Satoshi Nagasawa, Nagoya (JP); Wataru Matutani, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 11/723,637

(22) Filed: Mar. 21, 2007

(65) Prior Publication Data

US 2007/0221157 A1 Sep. 27, 2007

(30) Foreign Application Priority Data

Mar. 22, 2006 (JP) ............................ 2006-078710
Mar. 2, 2007 (JP) ............................ 2007-052147

(51) Int. Cl.
*F02B 23/04* (2006.01)
*G01P 3/66* (2006.01)

(52) U.S. Cl. .................................. 123/143 B; 73/35.15

(58) Field of Classification Search ............ 123/143 B, 123/143 C, 145 A, 169 C, 169 R, 145 R, 123/169 EL; 313/141, 118, 142, 122, 130; 219/270, 267, 533, 544; 73/35.11, 35.15
See application file for complete search history.

(56) References Cited

U.S. PATENT DOCUMENTS 6,611,084 B2 * 8/2003 Teramura et al. ........... 313/141
6,973,820 B2 * 12/2005 Watarai et al. ............. 73/35.13
7,234,429 B2 * 6/2007 Abe et al. ............... 123/169 R
2007/0114901 A1 * 5/2007 Nagasawa et al. .......... 313/141

FOREIGN PATENT DOCUMENTS

JP 57-15377 1/1982
JP 2-72577 3/1990

* cited by examiner

*Primary Examiner*—Willis R. Wolfe
*Assistant Examiner*—Johnny H. Hoang
(74) *Attorney, Agent, or Firm*—Sughrue Mion, Pllc.

(57) ABSTRACT

A plasma-jet spark plug includes a metal shell, an electrical insulator retained in the metal shell, a center electrode held in an axial hole of the electrical insulator to define a cavity by a front end face of the center electrode and an inner circumferential surface of the insulator axial hole and a ground electrode fitted to a front end face of the electrical insulator and formed with an opening for communication between the cavity and the outside of the spark plug and satisfies the following dimensional relationships:

$$d \leqq D \leqq 3d;$$

$$0.5\ \text{mm} \leqq d \leqq 1.5\ \text{mm};$$

$$L1 \leqq 1.5\ \text{mm};$$

$$2d \leqq L2 \leqq 3.5\ \text{mm; and}$$

$$L2 + \{(D-d)/2\} \leqq 3.5\ \text{mm}$$

where D is a diameter of the ground electrode opening; L1 is a thickness of the ground electrode; d is a diameter of the cavity; and L2 is a depth of the cavity.

5 Claims, 5 Drawing Sheets

PLASMA-JET SPARK PLUG AND IGNITION SYSTEM

BACKGROUND OF THE INVENTION

The present invention relates to a plasma-jet spark plug that produces a plasma by a spark discharge to ignite an air-fuel mixture in an internal combustion engine. The present invention also relates to an ignition system using the plasma-jet spark plug.

A spark plug is widely used in an automotive internal combustion engine to ignite an air-fuel mixture by a spark discharge. In response to the recent demand for high engine output and fuel efficiency, it is desired that the spark plug increase in ignitability to show a higher ignition-limit air-fuel ratio and achieve proper lean mixture ignition and quick combustion.

Japanese Laid-Open Patent Publication No. 2-72577 discloses, as one example of high-ignitability spark plug, a plasma-jet spark plug that has a pair of center and ground electrodes defining therebetween a discharge gap and an electrical insulator surrounding the discharge gap so as to form a discharge cavity within the discharge gap. In the plasma-jet spark plug, a spark discharge is generated through the application of a high voltage between the center and ground electrodes. A phase transition of the discharge occurs by a further energy supply to eject a plasma from the discharge cavity for ignition of an air-fuel mixture in an engine combustion chamber.

The plasma can be ejected in various geometrical forms such as flame form. The plasma in flame form (occasionally referred to as "plasma flame") advantageously extends in an ejection direction and secures a large contact area with the air-fuel mixture for high ignitability.

SUMMARY OF THE INVENTION

When the discharge cavity of the spark plug is relatively large in volume, a high energy supply is required for plasma flame discharge. However, the center and ground electrode get consumed heavily by such a high energy supply so that the spark plug deteriorates in durability.

It is therefore an object of the present invention to provide a plasma-jet spark plug capable of generating a plasma flame assuredly even by a relatively low energy supply.

It is also an object of the present invention to provide an ignition system using the plasmajet spark plug.

According to one aspect of the present invention, there is provided a plasma-jet spark plug, comprising: a metal shell; an electrical insulator retained in the metal shell and formed with an axial hole; a center electrode held in the axial hole of the electrical insulator so as to define a discharge cavity by a front end face of the center electrode and an inner circumferential surface of the axial hole in a front end part of the electrical insulator; and a ground electrode formed in a plate shape with an opening, fitted to a front end face of the electrical insulator to allow communication between the discharge cavity and the outside of the spark plug via the opening and connected electrically with the metal shell, the spark plug satisfying the following dimensional relationships: $0.5\ \text{mm} \leqq d \leqq 1.5\ \text{mm}$; $L1 \leqq 1.5\ \text{mm}$; $2d \leqq L2 \leqq 3.5\ \text{mm}$; and $L2+\{(D-d)/2\} \leqq 3.5\ \text{mm}$ on the condition of $d \leqq D \leqq 3d$ where D is a diameter of the opening of the ground electrode; L1 is a thickness of the ground electrode; d is a diameter of the discharge cavity; and L2 is an axial distance between the front end face of the electrical insulator and the front end face of the center electrode.

According to another aspect of the present invention, there is provided an ignition system, comprising: the above plasma-jet spark plug and a power source having a capacity to supply 50 to 200 mJ of energy to the spark plug.

The other objects and features of the present invention will also become understood from the following description.

DESCRIPTION OF THE EMBODIMENTS

Figure 1:
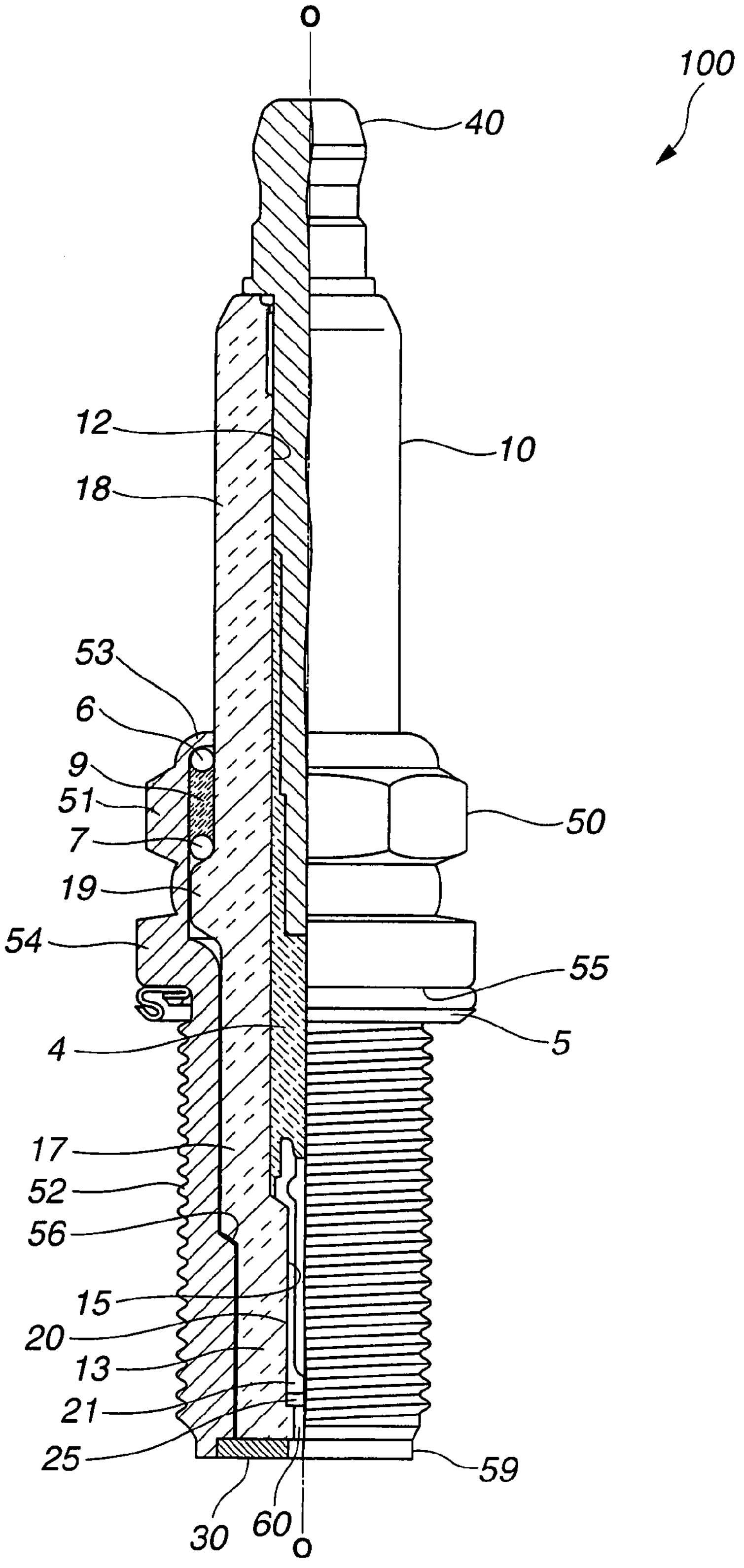
FIG. 1 is a half section view of a plasma-jet spark plug according to one exemplary embodiment of the present invention.

The present invention will be described below in detail with reference to the drawings.

As shown in FIGS. 1 to 4, an ignition system 250 according to one exemplary embodiment of the present invention is provided with a plasma-jet spark plug 100 for ignition of an air-fuel mixture in an internal combustion engine and a power supply unit 200 as a power source for energization of the plasma-jet spark plug 100. In the following description, the term "front" refers to a discharge side (bottom side in FIG. 1) with respect to the axial direction O of the plasma-jet spark plug 100 and the term "rear" refers to a side (top side in FIG. 1) opposite the front side.

The spark plug 100 has a ceramic insulator 10 as an electrical insulator, a center electrode 20 held in a front side of the ceramic insulator 10, a metal terminal 40 held in a rear side of the ceramic insulator 10, a metal shell 50 retaining therein the ceramic insulator 10 and a ground electrode 30 joined to a front end 59 of the metal shell 50 to define a discharge gap between the center electrode 20 and the ground electrode 30.

The ceramic insulator 10 is generally formed into a cylindrical shape with an axial cylindrical through hole 12 and made of sintered alumina. As shown in FIG. 1, the ceramic insulator 10 includes a flange portion 19 protruding radially outwardly at around a middle position in the plug axial direction O, a rear portion 18 located on a rear side of the flange portion 19 and having a smaller outer diameter than that of the flange portion 19, a front portion 17 located on a front side of the flange portion 19 and having a smaller outer diameter than that of the rear portion 18 and a leg portion 13 located on a front side of the front portion 17 and having a smaller outer diameter than that of the front portion 17 to form an outer stepped surface between the leg portion 13 and the front portion 17.

Figure 2:
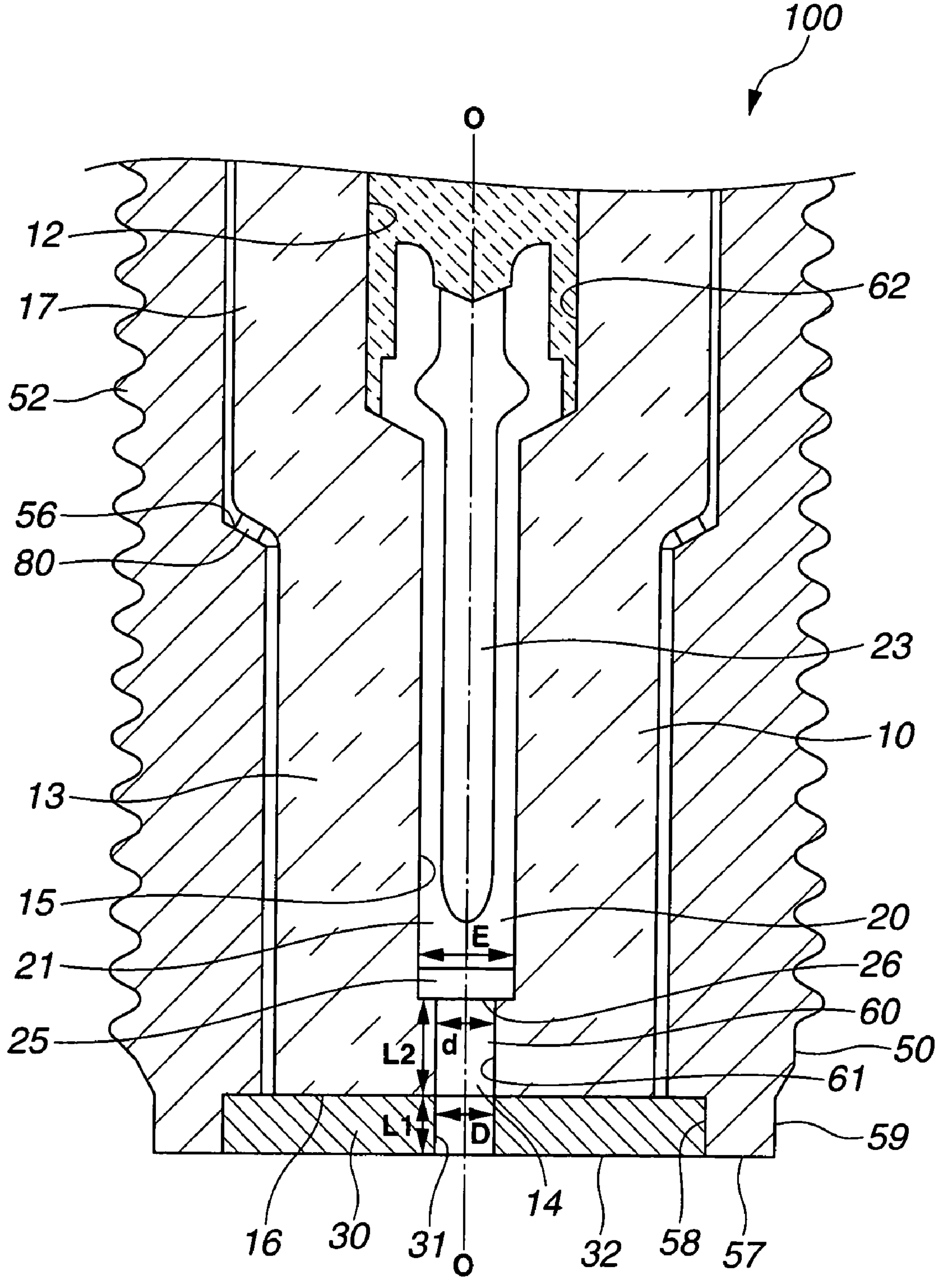
FIG. 2 is an enlarged section view of a front side of the plasma-jet spark plug, in the case of satisfying a dimensional relationship of D=d between a ground electrode opening D and a discharge cavity diameter d, according to one exemplary embodiment of the present invention.

As shown in FIGS. 1 and 2, the insulator through hole 12 extends along the plug axial direction O and includes an electrode holding region 15 located inside the insulator leg portion 13 to hold therein the center electrode 20, a front region 61 located on a front side of the electrode holding region 15 to define an opening 14 in a front end face 16 of the ceramic insulator 10 and a rear region 62 located through the front, rear and flange portions 17, 18 and 19. The front hole region 61 is made smaller in diameter than the electrode holding region 15 to form a front inner stepped surface between the front hole region 61 and the electrode holding region 15, whereas the rear hole region 62 is made larger in diameter than the electrode holding region 15 to form a rear inner stepped surface between the electrode holding region 15 and the rear hole region 62.

The center electrode 20 includes a column-shaped electrode body 21 made of nickel alloy material available under the trade name of Inconel 600 or 601, a metal core 23 made of highly thermal conductive copper material and embedded in the electrode body 21 and a disc-shaped electrode tip 25 made of precious metal and welded to a front end face of the electrode body 21 as shown in FIG. 2. A rear end of the center electrode 20 is flanged (made larger in diameter) and seated on the rear inner stepped surface of the insulator through hole 12 for proper positioning of the center electrode 20 within the electrode holding region 15 of the ceramic insulator 10. Further, a front end face 26 of the electrode tip 25 is held in contact with the front inner stepped surface of the insulator through hole 12 so that there is a small-volume concave cavity 60 (referred to as a "discharge cavity") formed within the discharge gap by an inner circumferential surface of the front region 61 of the insulator through hole 12 and a front end of the center electrode 20 (i.e. the front end face 26 of the electrode tip 25) in a front end part of the ceramic insulator 10.

The metal terminal 40 is fitted in the rear region 62 of the insulator through hole 12 and electrically connected with the center electrode 20 via a conductive seal material 4 of metal-glass composition and with a high-voltage cable via a plug cap for high voltage supply from the power supply unit 200 to the spark plug 100. The seal material 4 is filled between the rear end of the center electrode 20 and the front end of the metal terminal 40 within the rear region 62 of the insulator through hole 12 in such a manner as not only to establish electrical conduction between the center electrode 20 and the metal terminal 40 but to fix the center electrode 20 and the metal terminal 40 in position within the insulator through hole 12.

The metal shell 50 is generally formed into a cylindrical shape and made of iron material. As shown in FIGS. 1 and 2, the metal shell 50 includes a tool engagement portion 51 shaped to engage with a plug mounting tool e.g. a plug wrench, a threaded portion 52 having an inner stepped surface 56 on a front side of the tool engagement portion 51 and a flange portion 54 located between the tool engagement portion 51 and the threaded portion 52. The spark plug 100 becomes thus mounted on a cylinder block of the engine by screwing the threaded portion 52 into the engine cylinder block and seating the flange portion 54 on the engine cylinder block with a gasket 5 held between a surface of the engine cylinder block and a front surface 55 of the flange portion 54. The metal shell 50 further includes a crimp portion 53 located on a rear side of the tool engagement portion 51 and crimped onto the rear portion 18 of the ceramic insulator 10 as shown in FIG. 1. Annular rings 6 and 7 are disposed between the tool engagement and crimp portions 51 and 53 of the metal shell 50 and the rear portion 18 of the ceramic insulator 10, and a powdery talc material 9 is filled between these annular rings 6 and 7. By crimping the crimp portion 53 of the metal shell 50 onto the ceramic insulator 10 via the annular rings 6 and 7 and talc material 9, the ceramic insulator 10 is placed under pressure and urged frontward within the metal shell 50 so as to mate the outer stepped surface of the ceramic insulator 10 with the inner stepped surface 56 of the metal shell 50 via an annular packing 80 as shown in FIG. 2. The ceramic insulator 10 and the metal shell 50 is thus made integral with each other, with the annular packing 80 held between the outer stepped surface of the ceramic insulator 10 and the inner stepped surface 56 of the metal shell 50 to ensure gas seal between the ceramic insulator 10 and the metal shell 50 and prevent combustion gas leakage.

The ground electrode 30 is generally formed into a disc plate shape and made of metal material having high resistance to spark wear e.g. nickel alloy available under the trade name of Inconel 600 or 601. As shown in FIG. 2, the ground electrode 30 is integrally fixed in the front end 59 of the metal shell 50, so as to establish a ground for the spark plug 100 through the metal shell 50, by laser welding an outer circumferential surface of the ground electrode 30 to an inner surface 58 of the front end 59 of the metal shell 50. A rear end face of the ground electrode 30 is fitted to and held in contact with the front end face 16 of the ceramic insulator 10, whereas a front face 32 of the ground electrode 30 is aligned to a front end face 57 of the metal shell 50. Further, the ground electrode 30 has an opening 31 formed in the center thereof to provide communication between the discharge cavity 60 and the outside of the spark plug 100.

Figure 3:
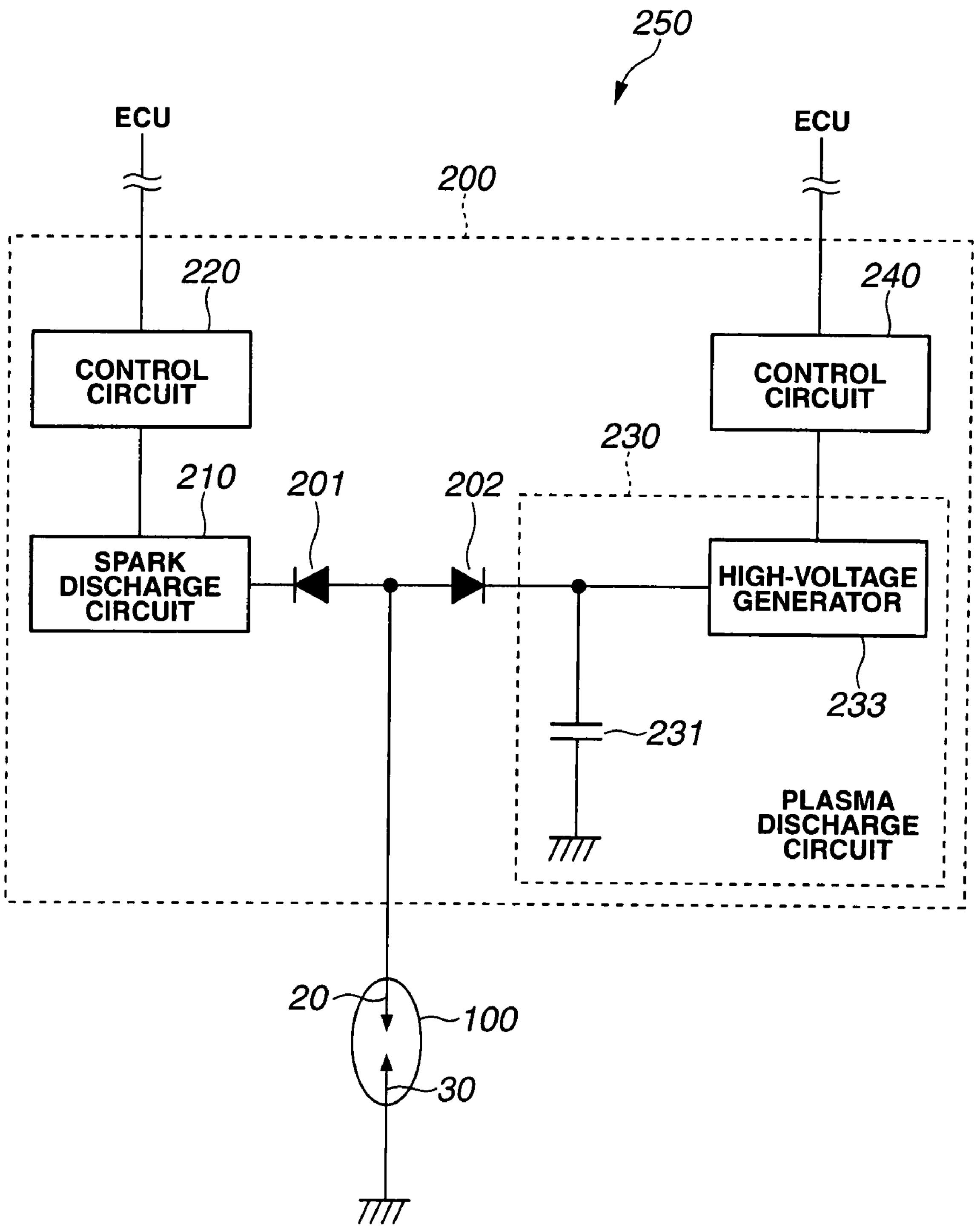
FIG. 3 is a circuit diagram of a power supply unit of an ignition system according to one exemplary embodiment of the present invention.

On the other hand, the power supply unit 200 is connected to an electric control unit (ECU) of the engine and has a spark discharge circuit 210, a control circuit 220, a plasma discharge circuit 230, a control circuit 240 and backflow prevention diodes 201 and 202 so as to energize the spark plug 100 in response to an ignition control signal (indicative of ignition timing) from the ECU as shown in FIG. 3.

The spark discharge circuit 210 is a capacitor discharge ignition (CDI) circuit and electrically connected with the center electrode 20 of the spark plug 100 via the diode 201 so as to place a high voltage between the electrodes 20 and 30 of the spark plug 100 and thereby induce a so-called trigger discharge phenomenon in the discharge gap. In the present embodiment, the sign of potential of the spark discharge circuit 210 and the direction of the diode 201 are set in such a manner as to allow a flow of electric current from the ground electrode 30 to the center electrode 20 during the trigger discharge phenomenon. The spark discharge circuit 210 may alternatively be of full-transistor type, point (contact) type or any other ignition circuit type.

The plasma discharge circuit 230 is electrically connected with the center electrode 20 of the spark plug 100 via the diode 202 so as to supply a high energy to the discharge gap of the spark plug 100 and thereby induce a so-called plasma discharge phenomenon in the discharge cavity 60. As shown in FIG. 3, the plasma discharge circuit 230 is a capacitor discharge ignition (CDI) circuit provided with a capacitor 231 and a high-voltage generator 233. One end of the capacitor 231 is connected to a ground, whereas the other end of the capacitor 231 is connected to the center electrode 20 of the spark plug 100 via the diode 202 and to the high-voltage generator 233. With this configuration, the capacitor 231 becomes charged with a negative-polarity voltage from the high-voltage generator 233 and supplies such a high charge energy to the discharge gap of the spark plug 100. The sign of potential of the high-voltage generator 233 and the direction of the diode 202 are also set in such a manner as to allow a flow of electric current from the ground electrode 30 to the center electrode 20 during the plasma discharge phenomenon. Alternatively, the plasma discharge circuit 230 may be of any other ignition circuit type such as full-transistor type or point (contact) type.

The control circuits 220 and 240 receive the ignition control signal from the ECU and control the operations of the spark and plasma discharge circuits 210 and 230 at the ignition timing indicated by the ignition control signal.

Before the ignition timing, the diodes 201 and 202 are operated to prevent the backflow of energy to the spark plug 100. In this state, the capacitor 231 and the high-voltage generator 233 forms a closed circuit in which the output voltage of the high-voltage generator 233 is charged to the capacitor 231.

At the ignition timing, the control circuit 220 enables the spark discharge circuit 210 to place a high voltage energy between the electrodes 20 and 30 of the spark plug 100. Then, the spark plug 100 induces a trigger discharge phenomenon in which a spark occurs with an electrical breakdown within the discharge gap. The electrical breakdown allows a passage of electricity even through the application of a relatively small voltage. When the control circuit 240 enables the capacitor 231 of the plasma discharge circuit 230 to supply a charged voltage energy to the discharge gap of the spark plug 100 during the occurrence of the electrical breakdown, the spark plug 100 subsequently induces a plasma discharge phenomenon in which the gas inside the discharge cavity 60 becomes ionized into a plasma phase. The thus-produced high-energy plasma is ejected from the discharge cavity 60 to the engine combustion chamber through the insulator opening 14 and the ground electrode opening 31. The air-fuel mixture is ignited with such a plasma flame and combusted through flame kernel growth in the engine combustion chamber.

The energy supply to the discharge gap is finished to insulate the discharge gap after the capacitor 231 releases its charge energy. Then, the capacitor 231 and the high-voltage generator 233 again form a closed circuit so that the capacitor 231 becomes charged with the output voltage of high-voltage generator 233. Upon receipt of the next ignition control signal from the ECU, the control circuits 220 and 240 enable the discharge circuits 210 and 230 to provide an energy supply to the spark plug 100 for plasma flame discharge.

Herein, the degree of growth of the plasma flame increases with the amount of energy supplied to the spark plug 100 (i.e. the sum of the amount of energy supplied from the spark discharge circuit 210 to induce the trigger discharge phenomenon and the amount of energy supplied from the capacitor 231 of the plasma discharge circuit 230 to induce the plasma discharge phenomenon). It is preferable to supply at least 50 mJ of energy for one plasma ejection (shot) in order to produce a sufficient and effective plasma flame and secure a larger contact area between the plasma flame and the air-fuel ratio for high ignitability. In view of the consumptions of the center and ground electrodes 20 and 30 (notably, the ground electrode 30) of the spark plug 100, it is preferable to limit the energy supply amount to 200 mJ or less. In other words, the power supply unit 200 is preferably of 50 to 200 mJ capacity, and more specifically, 160 mJ capacity. In the present embodiment, the capacitance of the capacitor 231 is set in such a manner that the total amount of energy supplied from the discharge circuits 210 and 230 to the spark plug 100 takes an appropriate value within the range of 50 to 200 mJ, and more specifically, 160 mJ.

In order for the spark plug 100 to generate an effective plasma flame and cause ignition of the air-fuel mixture properly and assuredly, the spark plug 100 has dimensions to satisfy the following relationships on the condition of $d \leqq D \leqq 3d$:

$$0.5\text{ mm} \leqq d \leqq 1.5\text{ mm};$$

$$L1 \leqq 1.5\text{ mm};$$

$$2d \leqq L2 \leqq 3.5\text{ mm; and}$$

$$L2 + \{(D-d)/2\} \leqq 3.5\text{ mm}$$

where D is a diameter (mm) of the opening 31 of the ground electrode 30; L1 is a thickness (mm) of the ground electrode 30; d is a diameter (mm) of the front region 61 of the insulator through hole 12, i.e., a diameter (mm) of the discharge cavity 60; and L2 is a distance (mm) between the front end face 16 of the ceramic insulator 10 and the front end face 26 of the center electrode 20 along the plug axial direction O, i.e., a depth (mm) of the discharge cavity 60.

If $D<d$, the plasma may become spread inside the discharge cavity 60 rather than ejected from the discharge cavity 60 through the insulator opening 14. This fails in effective plasma flame formation. When $d \leqq D$, the plasma becomes ejected in plasma form efficiently. When $D \leqq 3d$, the inner circumferential surface of the ground electrode opening 31 becomes located continuously from or adjacent to the inner circumferential surface of the discharge cavity 60 so as to provide a plasma ejection path that can produce some effect on the plasma form. The satisfaction of the above dimensional relationships is desired for effective plasma flame discharge on the condition of $d \leqq D \leqq 3d$.

If $d<0.5$ mm, the insulator opening 14 may become clogged with carbon deposits etc. during the long-term use of the spark plug 100. If $d>1.5$ mm, the plasma may become spread inside the discharge cavity 60 rather than ejected from the discharge cavity 60 in effective flame form. Even in this case, the plasma could be ejected in flame form by a higher energy supply. Such a higher energy supply however causes increases in power and electrode consumptions.

If $L1>1.5$ mm, the ground electrode 30 is too large in volume and may produce a quenching effect on flame kernel caused by the plasma discharge. It is especially preferable to satisfy the dimensional condition of $0.8\text{ mm} \leqq L1$ in view of the durability of the ground electrode 30.

Figure 4:
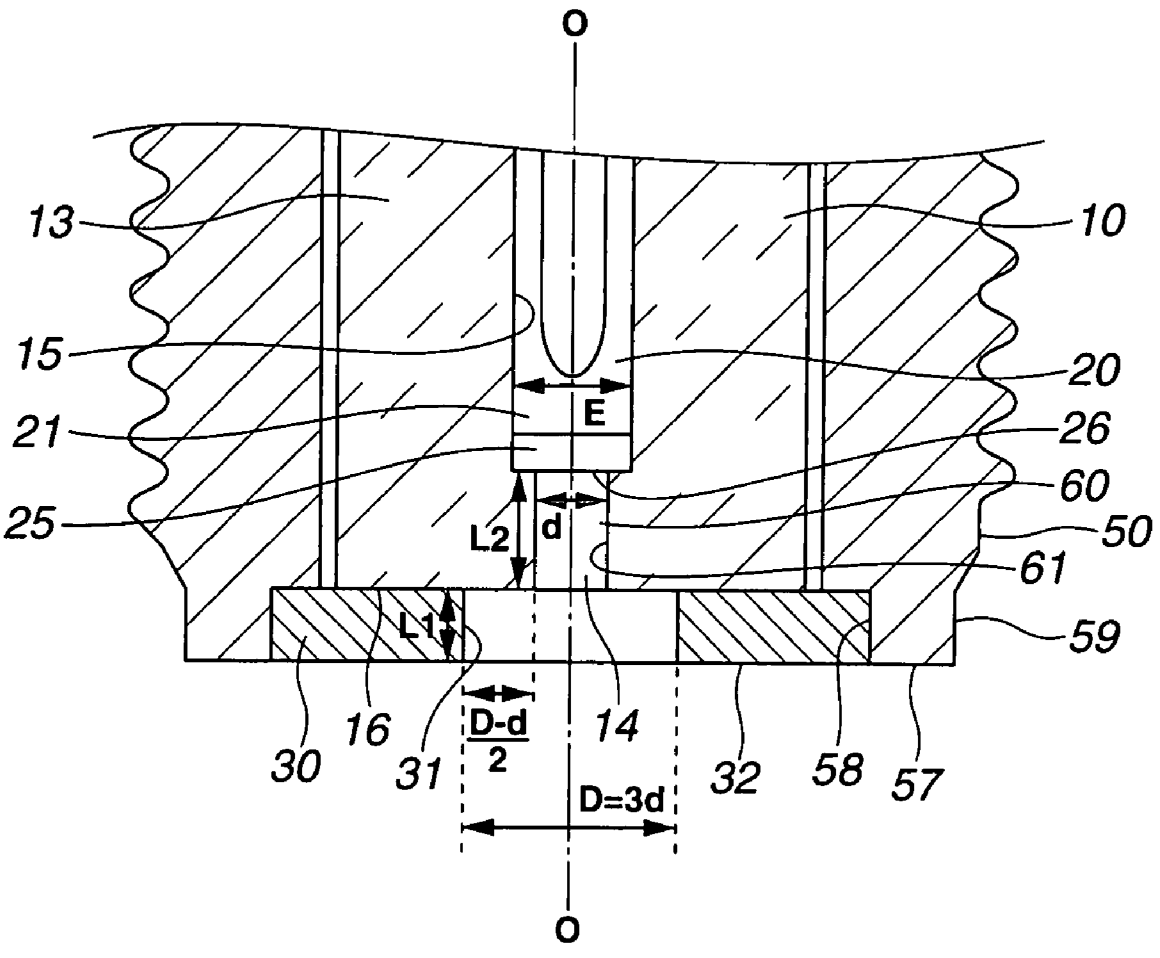
FIG. 4 is an enlarged section view of a front side of the plasma-jet spark plug, in the case of satisfying a dimensional relationship of D=3d between the ground electrode opening D and the discharge cavity diameter d, according to one exemplary embodiment of the present invention.

In the present embodiment, the spark occurs in the form of a so-called surface discharge (creepage) that causes the passage of electricity along an inner circumferential surface of the discharge gap. There is an advantage that the surface discharge can be generated even in a larger discharge gap than the air discharge by the application of a constant voltage. More specifically, the surface discharge occurs properly when the length of the inner circumferential surface of the discharge gap is smaller than or equal to 3.5 mm on the condition of $d \leqq D \leqq 3d$. In the case of $D=d$, the inner circumferential surface of the ground electrode opening 31 is located continuously from the inner circumferential surface of the discharge cavity 60 without the front end face 16 of the ceramic insulator 10 being exposed to the discharge gap as shown in FIG. 2 so that the length of the inner circumferential surface of the discharge gap becomes equal to the depth L2 of the discharge cavity 60. In the case of $d<D \leqq 3d$, by contrast, the inner circumferential surface of the ground electrode opening 31 is located radially outside the inner circumferential surface of the discharge cavity 60 with a part of the front end face 16 of the ceramic insulator 10 being exposed to the discharge gap as shown in FIG. 4 so that the length of the inner circumferential surface of the discharge gap becomes equal to the sum of the depth L2 of the discharge cavity 60 and the length (D−d)/2 of the exposed part of the front end face 16 of the ceramic insulator 10. In other words, the spark discharge occurs properly when L2≦3.5 mm on the condition of D=d or when L2+{(D−d)/2}≦3.5 mm on the condition of d<D≦3d. Further, the cavity 60 attains such a shape as to limit the spread of the plasma inside the cavity 60 in any directions other than the plug axial direction O for effective plasma flame discharge when L2≧2d.

It is also preferable to satisfy a dimensional relationship of d<E where E is an outer diameter of the center electrode 20. If d≧E, the center electrode 20 gets consumed by spark discharges to cause an increase in the size of the discharge gap. There arises a possibility of spark discharge failure due to such an increase in the size of the discharge gap. When d<E, the center electrode 20 gets consumed by spark discharges in such a manner as to make a depression in the front end face 26 and keep a remaining area of the front end face 26 around the depression exposed to the discharge gap so that the center electrode 20 performs its function properly by such an exposed area and maintains a continuation with the discharge cavity 60 without a change in the size of the discharge gap.

Upon satisfaction of the above dimensional relationships, the spark plug 100 becomes able to generate a plasma flame properly and assuredly even by a relatively low energy supply and secure a large contact area between the plasma flame and the air-fuel mixture. It is therefore possible for the spark plug 100 to attain both of high ignitability and durability.

The present invention will be described in more detail with reference to the following examples. It should be however noted that the following examples are only illustrative and not intended to limit the invention thereto.

Experiment 1

Test samples (sample numbers 1-1 and 1-2) of the spark plug 100 and test samples (sample numbers 1-3 and 1-4) of comparative spark plugs were produced under the same conditions except for their dimensions. The dimensions of the test samples are indicated in TABLE 1. Using the power supply unit 200 having a capacity to supply 200 mJ of energy for one discharge shot, each of the test samples was activated to eject a plasma. The length of the plasma ejected from the front end face 32 of the ground electrode 30 was determined by image observation. The test sample was judged to have succeeded in plasma flame discharge and rated as "O" when the plasma ejection length was 2 mm or larger. When the plasma ejection length was smaller than 2 mm, the test sample was judged to have failed in plasma flame discharge and rated as "X". The test results are indicated in TABLE 1.

TABLE 1

| Sample No. | D (mm) | L1 (mm) | d (mm) | L2 (mm) | L1 + L2 (mm) | | Plasma flame discharge |
|---|---|---|---|---|---|---|---|
| 1-1 | 0.8 | 0.8 | 0.8 | 1.7 | 2.5 | d = D | ○ |
| 1-2 | 0.8 | 1.5 | 0.8 | 3.5 | 5.0 | d = D | ○ |
| 1-3 | 0.8 | 0.8 | 1.5 | 1.7 | 2.5 | d > D | X |
| 1-4 | 0.8 | 1.5 | 1.5 | 3.5 | 5.0 | d > D | X |

It has been shown from TABLE 1 that, when d>D, the plasma becomes spread in any directions other than the ejection direction and thus cannot be ejected in effective flame form and that the plasma can be ejected from the spark plug 100 in effective flame form when all of the dimensional conditions are satisfied.

Experiment 2

Test samples (sample numbers 2-1 and 2-2) of the spark plug 100 and test sample (sample number 2-3) of comparative sample plug were produced under the same conditions except for their dimensions. The dimensions of the test samples are indicated in TABLE 2. Using the power supply unit 200 having a capacity to supply 160 mJ of energy for one discharge shot, each of the test samples was activated to eject a plasma. The ejection length of the plasma was determined by image observation to judge whether the test sample succeeded or failed in plasma flame discharge in the same manner as in Experiment 1. Further, each of the test samples was tested for its ignition limit air-fuel ratio by mounting the test sample on a 2000 cc six-cylinder engine, driving the engine at 2000 rpm and activating the test sample to cause ignition at different air-fuel ratios. The ignition limit air-fuel ratio of the test sample was determined as the air-fuel ratio value at the time the frequency of occurrence of misfire per minute became zero. The test results are indicated in TABLE 2.

TABLE 2

| Sample | D (mm) | L1 (mm) | d (mm) | L2 (mm) | L1 + L2 (mm) | Plasma flame discharge | Ignition limit air-fuel ratio |
|---|---|---|---|---|---|---|---|
| 2-1 | 0.8 | 1.0 | 0.8 | 1.5 | 2.5 | ○ | 24.5 |
| 2-2 | 1.2 | 0.5 | 1.2 | 1.5 | 2.0 | ○ | 24.5 |
| 2-3 | 2.0 | 0.5 | 2.0 | 0.5 | 1.0 | X | 23.0 |

It has been shown from TABLE 2 that, when all of the dimensional conditions are satisfied, the plasma can be ejected from the spark plug 100 in effective flame form to obtain improvement in ignitability even by a relatively low energy supply (160 mJ).

Experiment 3

Figure 5:
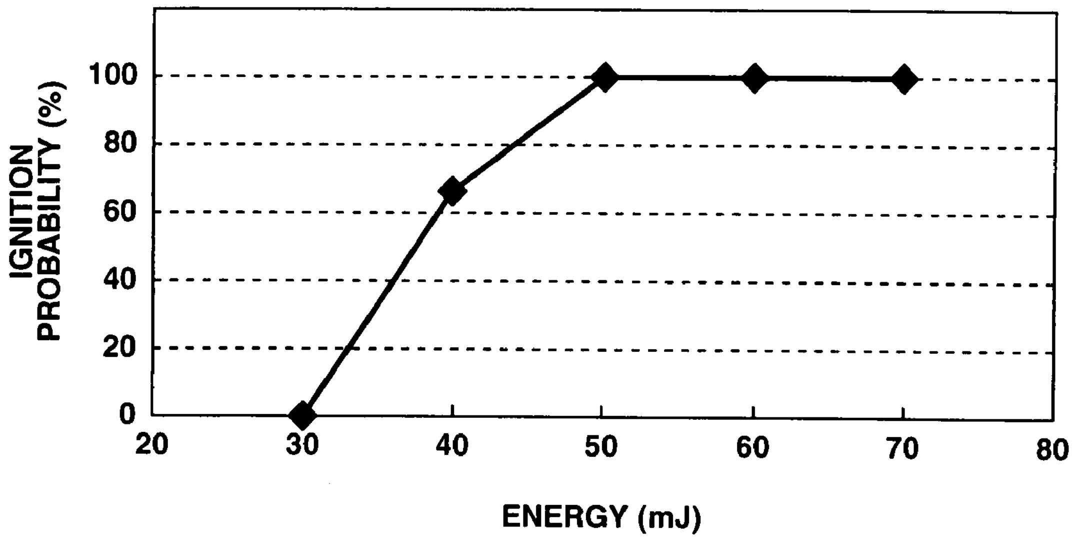
FIGS. 5 and 6 are graphs showing experimental data on ignition probability and electrode consumption of the plasma-jet spark plug according one exemplary embodiment of the present invention.

A test sample of the spark plug 100 was produced with the following dimensions: D=1.0 mm, L1=1.0 mm, d=0.5 mm and L2=2.0 mm and subjected to ignitability test. The ignitability test was herein conducted by mounting the test sample in a pressure chamber, charging the chamber with a mixture of air and $C_3H_8$ fuel gas (air-fuel ratio: 22) to a pressure of 0.05 MPa, activating the test sample by means of the power supply unit 200 and monitoring the pressure in the chamber with a pressure sensor to judge the success or failure of ignition of the air-fuel mixture. The output of the power supply unit 200 was varied from 30 to 70 mJ by using various power coils. The ignition probability of the test sample was determined by performing the above series of process steps 100 times at each energy level. The test results are indicated in FIG. 5. The test sample failed to cause ignition by the energy supply of 30 mJ and had an ignition probability of about 65% by the energy supply of 40 mJ. However, the test sample had an ignition probability of 100% by the energy supply of 50 mJ or more. It has been thus shown that the plasma can be ejected in effective flame form to obtain sufficient ignitability by supplying at least 50 mJ of energy to the spark plug 100.

Experiment 4

Figure 6:
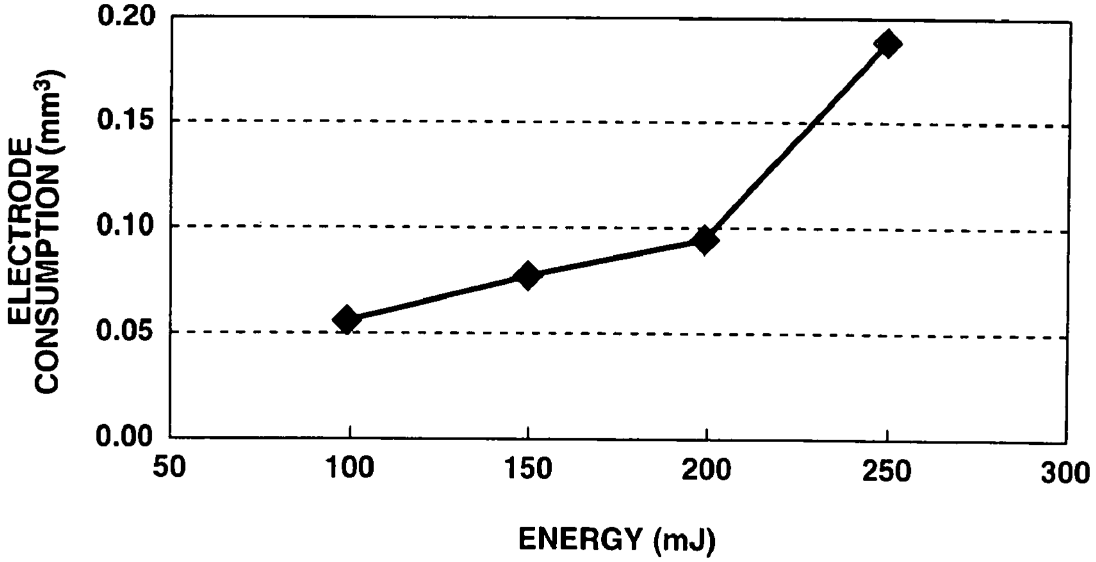

Test samples of the spark plug 100 were produced in the same manner as in Experiment 3 and subjected to durability test. In each of the test samples, the ground electrode 30 was made of Ir-5Pt alloy. The durability test was herein conducted by charging a pressure chamber with $N_2$ gas to a pressure of 0.4 MPa, mounting the test sample in the pressure chamber, activating the test sample by means of the power supply unit 200 to cause a continuous discharge at 60 Hz for 200 hours and measuring the amount of consumption of the ground electrode 30 during the continuous discharge. The output of the power supply unit 200 was varied from sample to sample. The test results are indicated in FIG. 6. The test sample had an electrode consumption of about 0.06 $mm^3$ by the energy supply of 100 mJ. The test sample had an electrode consumption of about 0.08 $mm^3$ by the energy supply of 150 mJ. Further, the test sample had an electrode consumption of slightly less than 0.10 $mm^3$ by the energy supply of 200 mJ. The electrode consumption amount significantly increased when the energy supply exceeded 200 mJ, and the test sample had an electrode consumption of about 0.19 $mm^3$ by the energy supply of 250 mJ. It has been thus shown that the electrode consumption can be limited to a relatively low level to prevent a durability deterioration by supplying 200 mJ or less of energy to the spark plug 100.

The entire contents of Japanese Patent Application No. 2006-078710 (filed on Mar. 22, 2006) and No. 2007-052147 (filed on Mar. 2, 2007) are herein incorporated by reference.

Although the present invention has been described with reference to the above-specific embodiments of the invention, the invention is not limited to the these exemplary embodiments. Various modification and variation of the embodiments described above will occur to those skilled in the art in light of the above teaching.

For example, the discharge circuits 210 and 230 may be controlled directly by the ECU although the control circuits 220 and 240 are provided in the power supply unit 200 independently of and separately from the ECU in the above embodiment.

The power source and circuit configurations of the power supply unit 200 may be modified to allow a passage of electricity from the center electrode 20 to the ground electrode 30 e.g. by generating a positive-polarity voltage from the high-voltage generator 233 and by reversing the directions of the diodes 201 and 202. It is however desirable to design the power supply unit 200 in such a manner as to allow the passage of electricity from the ground electrode 30 to the center electrode 20 as in the above-mentioned embodiment, in view of the consumption of the center electrode 20, because the electrode tip 25 of the center electrode 20 is relatively small as compared to the ground electrode 30.

The scope of the invention is defined with reference to the following claims.

What is claimed is:

1. A plasma-jet spark plug, comprising:

a metal shell;

an electrical insulator retained in the metal shell and formed with an axial hole;

a center electrode held in the axial hole of the electrical insulator so as to define a discharge cavity by a front end face of the center electrode and an inner circumferential surface of the axial hole in a front end part of the electrical insulator; and a ground electrode formed in a plate shape with an opening, fitted to a front end face of the electrical insulator to allow communication between the discharge cavity and the outside of the spark plug via the opening and connected electrically with the metal shell, the spark plug satisfying the following dimensional relationships on the condition of $d \leqq D \leqq 3d$:

$$0.5\ \text{mm} \leqq d \leqq 1.5\ \text{mm};$$

$$L1 \leqq 1.5\ \text{mm};$$

$$2d \leqq L2 \leqq 3.5\ \text{mm; and}$$

$$L2+\{(D-d)/2\} \leqq 3.5\ \text{mm}$$

where D is a diameter of the opening of the ground electrode; L1 is a thickness of the ground electrode; d is a diameter of the discharge cavity; and L2 is an axial distance between the front end face of the electrical insulator and the front end face of the center electrode.

2. A plasma-jet spark plug according to claim 1, satisfying a dimensional relationship of $L1 \geqq 0.8$ mm.

3. A plasma-jet spark plug according to claim 1, satisfying a dimensional relationship of $d<E$ where E is an outer diameter of the center electrode.

4. A plasma-jet spark plug according to claim 1, further comprising a power source having capacity to supply 50 to 200 mJ of energy to the spark plug.

5. A plasma-jet spark plug according to claim 4, wherein the power source is 160 mJ capacity.

* * * * *